DUAL MODULATION OF CARRIER WAVE

Filed June 27, 1947 3 Sheets-Sheet 1

INVENTOR.
KARL F. ROSS
BY A. John Michel
ATTORNEY

Nov. 25, 1952 K. F. ROSS 2,619,547

DUAL MODULATION OF CARRIER WAVE

Filed June 27, 1947 3 Sheets-Sheet 2

INVENTOR.
KARL F. ROSS
BY A. John Michel
ATTORNEY

DUAL MODULATION OF CARRIER WAVE

Filed June 27, 1947 3 Sheets-Sheet 3

INVENTOR:

Karl F. Ross

Patented Nov. 25, 1952 2,619,547

UNITED STATES PATENT OFFICE 2,619,547

DUAL MODULATION OF CARRIER WAVE

Karl F. Ross, Bronx, N. Y.

Application June 27, 1947, Serial No. 757,611

20 Claims. (Cl. 179—15)

The present invention relates to a system for transmitting and receiving two different types of signal by means of a single carrier frequency.

An object of the invention is to provide a method of using a single carrier wave for the transmission of two different types of signal.

Another object of the invention is to provide a method of detecting two different types of signal received over a single carrier wave.

A further object of the invention is to provide a method of transmitting a plurality of signals over a smaller frequency band than required by conventional methods.

Still another object of the invention is to provide a method of demodulating a phase and amplitude modulated wave wherein the two types of modulation are caused by different signals.

A still further object of the invention is to provide demodulator means for separating two pairs of conjugate sidebands of the same carrier frequency in which the phase of the carrier has been shifted, preferably by an angle of 90 degrees.

Yet another object of the invention is to provide demodulator means for separating a pair of conjugate sidebands of a carrier frequency and a further sideband of the same carrier, used to convey two different signals at the same time.

The above and other objects will become apparent in the course of the following description, taken in conjunction with the accompanying drawing in which.

It is well known that the most economical method, in terms of band width, of transmitting a complex audio signal by way of a carrier wave is to modulate the carrier amplitude with the signal. Such a modulation gives rise to only a single pair of conjugate sidebands, the width of each sideband corresponding to the width of the audio spectrum to be transmitted. If it is desired to accommodate a plurality of signals at the same time, by means of respective carriers, then the required overall band width will have to be substantially greater than the combined width of all the sidebands in order to allow for the necessary spacing between the sidebands of different carriers.

Both phase and frequency modulation require greater band width than amplitude modulation. It is known, however, that in a phase modulated carrier wave only the first pair of conjugate sideboards need to be considered if the index of modulation, variously known in the art also as the degree of modulation, depth of modulation or modulation factor and definable in terms of proportional change of carrier amplitude, phase or frequency by the signal, is small, the width of these sidebands being the same as that of the sidebands obtained by amplitude modulation.

In accordance with a feature of the invention it is now proposed to modulate the amplitude of a carrier with a first signal, of maximum width $p$, and to modulate the phase of the same carrier with a second signal, of maximum width $q$, the resulting overall band width being $2(p+q)$ centered on the frequency $f$ of the carrier. No spacing is required between the sidebands produced by signals $p$ and $q$ since these sidebands actually overlap, the required band width being consequently less than if the two signals had been used to modulate different carriers having the necessary spacing between them. Also, the use of but a single carrier frequency entails a substantial simplification. Thus it is possible by this arrangement to utilize the same frequency band alternately for wide-band transmission of one set of signals in conventional manner or for the simultaneous transmission of two different sets of signals, each of lesser width, by the dual modulation of a carrier in accordance with the invention.

Figure 1:
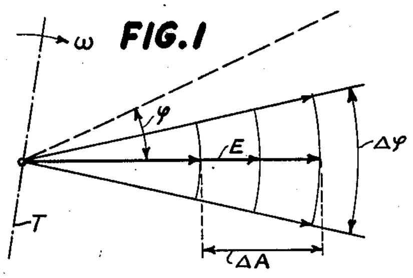
Figs. 1 through 8 are explanatory vector diagrams.

Fig. 1 is a vector diagram of a phase and amplitude modulated carrier, represented by the vector E, rotating at the average angular velocity $\omega=2\pi f$ relative to the time vector T. The amplitude variation of vector E is indicated by $\Delta A$ and its phase swing is given by $\Delta\varphi$.

It will be seen that the amplitude and phase swings are independent from each other, permitting the reproduction of the signal $p$ through ordinary envelope detection and the demodulation of a $q$ by any known kind of phase discriminator. A phase discriminator suitable for this purpose has been disclosed in my co-pending U. S. patent application No. 737,907, filed March 28, 1947, now Patent No. 2,530,081, granted November 14, 1950. If, however, the carrier frequency $f$ is exactly available at the receiving end, then phase demodulation may be effected by a method utilizing principles likewise disclosed in my above-identified patent. In this case let F represent the vector of the reference wave of frequency $f$, suitably displaced from E in such a manner that the angle $\varphi$ between the two vectors will always have the same sign. Then it is proposed to derive from F a series of sharp pulses, termed trigger pulses in my co-pending application, and to derive from E a second set of pulses, described as registering pulses, each pulse occurring at the beginning of a cycle or half-cycle of the respective wave. The two types of pulses alternate and each registering pulse is spaced from the trigger pulse immediately preceding by a time interval proportional to the angle $\varphi$. These two pulses may then be applied to a generator of sawtooth waves, as fully described in my co-pending application, to give a serrate output voltage the envelope of which corresponds to the desired signal.

It may be assumed that the doubly modulated vector E has been produced at the transmitter by first passing the unmodulated carrier through a phase modulating circuit, supplied with the modulating signal $q$, and then modulating the output of the phase modulator in amplitude by means of the signal $p$. Actually, however, this method will give rise to an infinite number of sidebands which it will of course be impractical to transmit or to receive. The suppression of the higher-order sidebands, however, will not only affect the linearity of the phase modulation but will also result in a certain amount of amplitude distortion due to phase variations. This will be better understood from Fig. 2.

Figure 2:
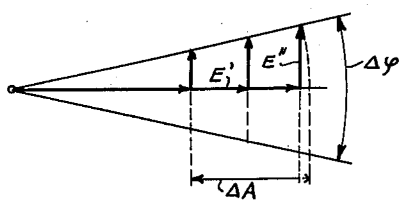

In Fig. 2 there is shown a vector E phase and amplitude modulated in such a manner that the resulting wave will not contain any sidebands other than those comprised by the expression $f \pm p \pm q$. The doubly modulated vector may be thought of as being composed of two vectors E′ and E″ which in their unmodulated condition had been displaced by 90 degrees. These two carriers are then assumed to have been amplitude modulated by the signal $p$, care having been taken to make the modulation index the same for both carriers although the absolute magnitude of E″ is considerably less than that of E′. The modulated carrier E″ is thereupon once more amplitude modulated, this time with the signal $q$, giving rise to the sidebands $f \pm p$ in the vector E′ and to sidebands $f \pm p \pm q$ in the carrier E″, according to the principle of superposition. This will result in a phase shift which is independent of amplitude variations and only depends on the modulating signal $q$, but the amplitude of the resulting wave will not be unaffected by the phase variations as shown by the dotted portion of the arrow $\Delta A$. For low phase modulation index, however, i. e. when E″ is substantially smaller than E′, this distortion of the wave amplitude by the signal $q$ will be negligible.

Figure 12:
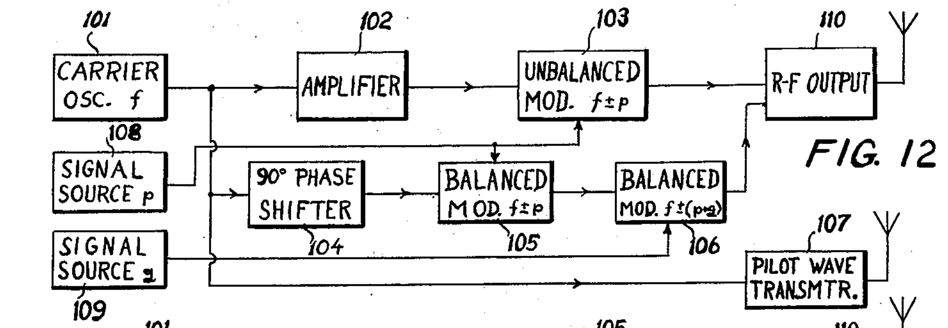
Figs. 12 and 13 show different circuit diagrams for transmitting arrangements according to the invention.

Reference is now made to Fig. 12 for a circuit arrangement adapted to produce an output of the type shown in Fig. 2 as analyzed above. An oscillator 101 produces the carrier E′ while a phase shifter 104, energized from this oscillator, produces the carrier E″, both carriers having the frequency $f$. Amplifier 102, connected directly to oscillator 101, serves to increase carrier E′ over carrier E″ to minimize amplitude distortion, as previously noted. Unbalanced modulator 103, following amplifier 102, modulates the amplitude of carrier E′ with a signal $p$ derived from a source 108. Two balanced modulators 105 and 106, connected in tandem in the output circuit of phase shifter 104, modulate the carrier E″ with signal $p$ and with a signal $q$, respectively, the latter being derived from a source 109. The modulators 103 and 106 feed the transmitter proper, indicated at 110, which radiates their combined output having the form given by the composite vector E′, E″ in Fig. 2.

Under certain conditions, i. e. when both the phase modulation index and the degree of amplitude modulation can be small, it will be possible further to reduce the band width by omitting the step of modulating the amplitude of the smaller carrier. It will be understood, incidentally, that the vector E″ represents the output of a balanced modulator containing the two sidebands produced by the signal $q$ but having the carrier suppressed. The vector E″ will reverse its phase periodically, causing the phase shift $\Delta\varphi$ to be symmetrical as shown.

Figure 3:
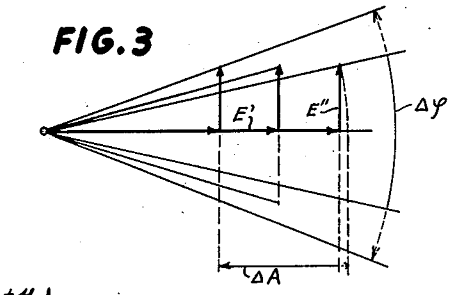

Fig. 3 illustrates the case just referred to wherein E′ has associated therewith the sidebands $f \pm p$ and E″ has associated therewith the sidebands $f \pm q$, the total band width required being then either $2p$ or $2q$ depending on which is larger. Although this entails a considerable compression of the necessary frequency range, it will be seen from the dotted portions of arrows $\Delta A$ and $\Delta\varphi$ that mutual distortion occurs between the phase and the amplitude of the resulting wave. Nevertheless it may be found advantageous at least in some cases to utilize the method illustrated in Fig. 3 so as to produce a phase and amplitude modulated wave to be subsequently demodulated in the manner described above.

If, however, the carrier is available at the receiving end, then it is possible in accordance with a further feature of my invention to employ any degree of modulation of both carriers and still to be able to reproduce the two modulating signals without mutual distortion. In fact, it is possible to suppress completely the two carriers and to transmit a combination of signal waves as illustrated by the vector diagram of Fig. 4. The method presently to be described assumes, however, that a reference wave available at the receiver not only has precisely the same frequency as the carriers employed at the transmitter but also has a known phase relationship thereto. The manner in which the carrier is made available at the receiver has no bearing on the present invention; it may be transmitted over a separate metallic circuit, or by means of electromagnetic waves lying outside the signal band, such as a multiple or submultiple frequency or a pair of frequencies whose sum or difference is the desired carrier. Means for thus transmitting the carrier have been shown schematically in Fig. 12 in the form of a pilot wave transmitter 107 connected to the output of oscillator 101.

Figure 4:
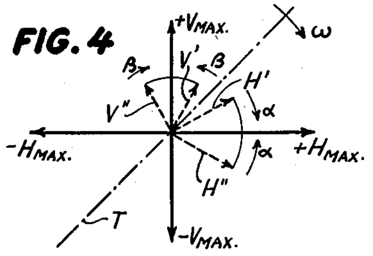

In Fig. 4 there are shown two pairs of sideband frequencies indicated by vectors V′, V″ and H′, H″, respectively. The vectors V′ and V″ combine to form the vector V, their angular velocity relative to V being $+\beta$ and $-\beta = \pm 2\pi q$ with the vector V rotating at the angular velocity $\omega$ with respect to the time vector T. Similarly, the vectors H′ and H″ combine to form the vector H, their angular velocity relative to H being $+\alpha$ and $-\alpha=2\pi p$ with the vector H likewise rotating at the angular velocity $\omega$ with respect to T. The vectors V and H vary between the limits $\pm$V max. and $\pm$H max., respectively, while always remaining at right angles to each other.

Since the two vectors have no components in each other's direction, it is now proposed to reproduce the audio frequency signal represented by each by determining the magnitude of one vector at the instant when the other is known to go through zero. For reasons subsequently to be explained, it may desirable to superimpose upon the V and H vectors a single vector F′ intersecting the former at an angle of preferably 45°, see Fig. 5, its length being selected so that the rectangle G will lie completely within the quadrant defined by the positive half-axes $+x$ and $+y$ paralleling, respectively, the vectors H and V. The result of this superposition will be the same as if a phase and amplitude modulated wave of the type shown in Fig. 3 had been transmitted originally. The tip of the resulting vector will be seen to be movable between the limits defined by the rectangle G of area $2H_{max.}\times 2V_{max.}$ The time vector T is shown at the instant when T is in quadrature with F′, with the value of the composite wave being almost but generally not quite zero. After a time $t=\frac{1}{8}f$ the vector T will lie in the $y$ axis and the instantaneous value of H will be zero while that of V will be a maximum. Thus, if only the values of the composite vector at these instants will be taken into account, the result will be a vector $Fy'\pm V$ which, since $Fy'$ is the fixed projection of F′ upon the $y$ axis, will be the equivalent of a wave amplitude modulated with signal frequency $q=\beta/2\pi$. In similar manner the vector $F_x'\pm H$ is available at the $x$ axis although, for reasons given below, I prefer to derive the signal frequency $p$ from the vector $F_x''\pm H$, Fig. 6, wherein $F_x''$ is the projection upon the $x$ axis of a vector F″ displaced by 90° with respect to F′ and selected so that the rectangle G will lie within the quadrant defined by $+x$ and $-y$.

Figure 7:
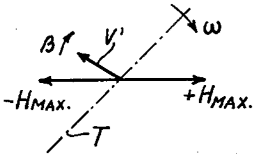

In Fig. 7 there is analyzed the case in which two sidebands of a frequency $p$ but only one sideband of a frequency $q$, say $f-q$, are transmitted. The vector H will again vary between its values $\pm H_{max.}$ along a line having angular velocity $\omega$ relative to the time vector T. The vector V′, however, will be unmatched and will rotate relative to H with a variable angular velocity $\beta$. Proceeding again as in Fig. 5 by adding a vector F′, we shall find that the tip of the resulting composite vector will be displaceable within an area G′ (Fig. 8) defined by a rectangle of area $2H_{max.}\times 2V'$ plus two semicircles of radius V′. The width of this area will be V′ and the projection of the composite vector upon the $y$ axis will be the amplitude modulated vector $F_y'\pm V'$.

The wave represented by vector $F_y\pm V'$ will again be an amplitude modulated wave having a modulating frequency $q=\beta/2\pi$. From this wave the frequency $q$ can be determined by detection and a wave of frequency $f-q$ may thereupon be synthesized. This new wave may be represented by a vector $-V'$ which, when added with the proper phase and magnitude to the vector system of Fig. 7, will leave only the vector H from which the signal $p$ can be determined by simple means.

Figure 13:
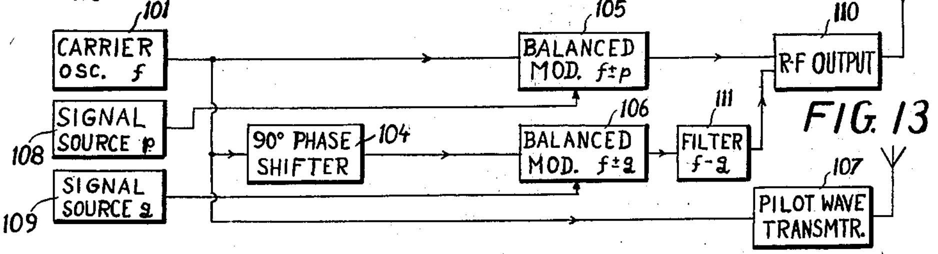

Fig. 13 shows how the transmitter Fig. 12 may be modified to produce an output corresponding to the vector diagram of Fig. 7, identical elements in Figs. 12 and 13 having been designated by the same reference numerals. Thus in Fig. 13 the unbalanced modulator 103 in the output circuit of oscillator 101 has been replaced by balanced modulator 105, balanced modulator 106 being connected directly to the output of phase shifter 104. A filter 111, passing the sideband $f-q$ but suppressing the conjugate sideband $f+q$, has been inserted between modulator 106 and transmitter 110.

Figure 5:
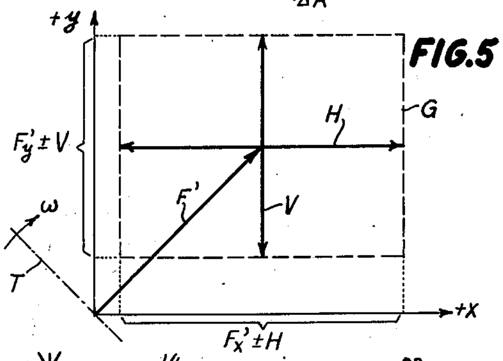
Figure 6:
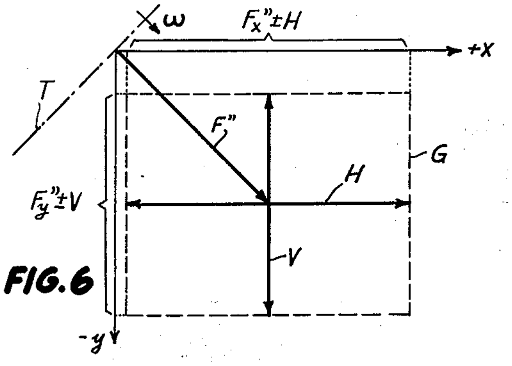
Figure 8:
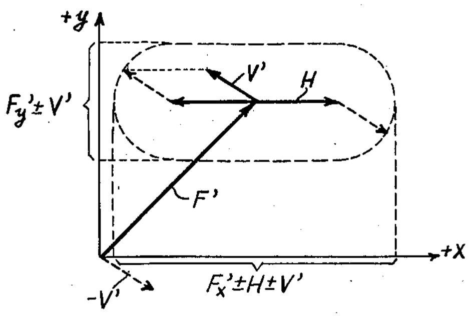
Figure 9:
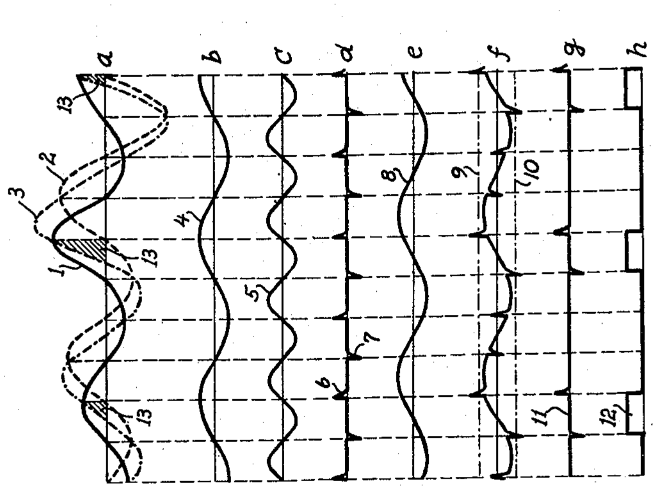
Fig. 9 is a graph explaining the phase relationship of various waves in a receiving arrangement according to the invention.

The actual method of determining the values of $F_y\pm V$, $F_x''\pm H$ and $F_y'\pm V'$ Figs. 5, 6 and 8, will be explained with the aid of the graph shown in Fig. 9. In Fig. 9*a* there is shown in solid lines a wave 1 corresponding to the vector $F_y'\pm V$ of Fig. 5 and in broken lines a wave 2 corresponding to vector $F_x'\pm H$. Actually available at the receiver, after the addition of F′, will be the wave 3 shown in dot dash lines which is the sum of waves 1 and 2. In Fig. 9*b* the wave 4 is a pilot wave of carrier frequency $f$ in phase with the wave 1. Wave 5, Fig. 9*c*, is the second harmonic of wave 4 and has a frequency $2f$ double the carrier frequency. The graph of Fig. 9*d* shows a series of positive and negative pulses 6 and 7, respectively, derived from the wave 5 in the manner disclosed in my Patent No. 2,530,081. Wave 8, graph 9*e*, is derived from wave 4 and lags behind the latter by 45°; wave 8 is generally but not precisely in phase with wave 3 of Fig. 9*a*.

The graph 9*f* illustrates the superimposition of pulses 6 and 7 upon the wave 8. Clipping above and below lines 9 and 10, respectively, and subsequently combining the clipped pulses, we receive a pulse train such as that shown in Fig. 9*g* in which a pair of pulses 11, of opposite polarity, occurs once during each cycle of wave 3. Fig. 9*h* shows a train of rectangular pulses 12 derivable in any known manner from the pair of pulses 11.

The end of the pulse 12 will be seen to occur at the instant when the wave 2 goes through zero, the instantaneous amplitude of wave 3 being therefor equal to the simultaneous peak value of wave 1. It will also be found that by virtue of the suitable selection of vector F′ the pulse 12 will coincide with the rising portion of wave 3. In similar manner it will be possible, by substituting F″ for F′, to reverse the polarity of wave 1 relative to wave 2 in such a manner that the rising portion of wave 3 will occur just before wave 1 goes through zero, permitting determination of the peaks of wave 2 by the same method as will now be described with reference to wave 1.

Let us assume that the wave 3 is applied to a normally blocked transducer such as an amplifier arranged to be unblocked only during occurrence of pulses 12. In the output circuit of the amplifier there may be provided a rectifier in series with a condenser such as disclosed, for example, in Fig. 6 of my above-identified patent. Only the portions of wave 3 subtending the shaded areas 13 will then be effective to charge the condenser, the peaks of these shaded areas defining an envelope which is identical with the envelope of wave 1 and varies with signal frequency $q$. In analogous manner the signal frequency $p$ may be detected. It may also be mentioned that it will be possible to double the number of effective areas 13 by inverting, for instance, the negative half of wave 3 in a full-wave rectifier, the pulses 12 being then arranged to occur twice as often and to have preferably not more than half the width shown.

Figure 10:
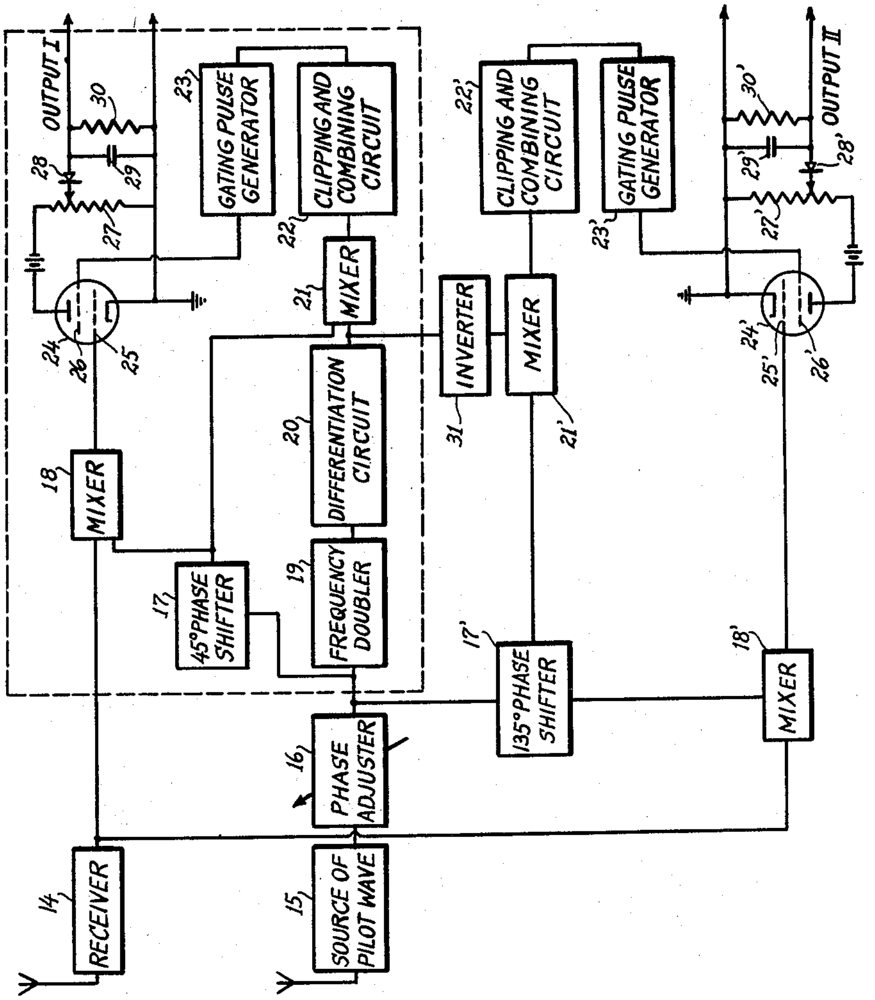

Fig. 10 shows a circuit arrangement for carrying out the method described with reference to Figs. 4 through 6 and 9. The receiver 14 selects the electromagnetic waves corresponding to the vector diagram of Fig. 4, lying within the larger of the two frequency bands $(f\pm p)$ and $(f\pm q)$. A source 15 of pilot frequency $f$ serves to reintroduce the carrier at the receiving station. A phase adjusting circuit 16 is provided to compensate for any spurious phase shift of the output of source 15 relative to the vector V in the output of receiver 14. The wave 4 (Fig. 9b) obtained at the output of phase adjuster 16 is then applied to a 45° phase shifter 17 to produce the wave 8 which, when combined in mixer 18 with the output of receiver 14, will give the wave 3 of Fig. 9a. The wave 4 is also applied to a frequency doubler 19 to give the wave 5 from which the pulses 6, 7 are obtained in the differentiation circuit 20 which may also include a pulse shaping circuit. Next the wave 8 from phase shifter 17 is superimposed in mixer 21 upon the pulses 6 and 7 obtained from circuit 20, resulting in a wave form as shown in graph 9f. The clipping and combining circuit 22 serves to produce the pairs of pulses 11 of Fig. 9g which are then applied to a gating pulse generator 23 to produce the rectangular pulses 9h of positive polarity. A normally blocked amplifier 24 has the output of mixer 18 applied to its first grid 25 and the unblocking pulses 12 from generator 23 to its second grid 26. Connected in the anode circuit of amplifier 24 is an output resistor 27, which may be a potentiometer, having connected thereto a rectifier 28 in series with a condenser 29. The condenser 29 is shunted by a leakage resistor 30. With proper selection of the time constant of the circuit 29, 30 the signal frequency $q$ will appear across the condenser 29.

To obtain the frequency $p$ there is provided a demodulating circuit comprising a 135° phase shifter 17′, a mixer 18′, a mixer 21′ connected to the output of differentiation 20 circuit over an inverter 31, a clipping and combining circuit 22′, a gating pulse generator 23′, a blocked amplifier 24′ having two grids 25′ and 26′, an output resistor 27′, a rectifier 28′, a condenser 29′ and a leakage resistor 30′. All these elements have the same functions as their respective unprimed counterparts. The frequency $p$ will appear across the condenser 29′.

Figure 11:
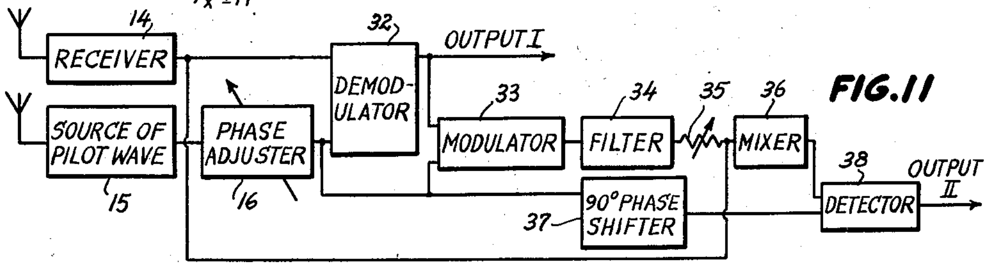
Figs. 10 and 11 show different circuit diagrams for a receiving arrangement according to the invention.

In Fig. 11 there is shown a modification of the arrangement of Fig. 10, suitable for demodulating a compound wave in which one of the sidebands has been suppressed as discussed in connection with Figs. 7 and 8. Such an arrangement will be of value where one of the audio frequency bands, e. g. that designated by its limiting frequency $q$, will be substantially wider than the other. In this case the frequency band of the receiver 14 may be limited, for example, to the range between the frequencies $f-q$ and $f+p$, representing a considerable saving where $p$ is appreciably smaller than $q$. The output of receiver 14 and of phase adjuster 16 is again applied to a demodulating circuit, designated 32, which may be the same as the circuit shown within the dotted limits in Fig. 10. Thus the demodulator 32 may comprise all the elements 17 through 30 shown in Fig. 10 and its output will be the frequency $q$. This output is now combined, in a modulator 33, with that of adjuster 16 to give the two sidebands $f+q$ and $f-q$ of which the latter only is selected in the subsequent filter 34. A wave of frequency $f-q$, having the proper polarity and adjusted to suitable magnitude by means of variable resistance 35, is then combined with the output of receiver 14 by means of mixer 36 to give the vector H of Fig. 7. The pilot wave 4 of carrier frequency $f$, in phase with the vector H after having been passed through a 90° phase shifter 37, is then combined with H in the input of detector 38 to give a normal amplitude modulated wave. The signal $p$ will appear in the output of detector 38.

In operation it may be desirable first to adjust the setting of phase adjuster 16 until the undistorted appearance of signal $q$ at output I indicates that the pilot wave 4 has the proper phase. After that, in the case of the arrangement of Fig. 11, it may be necessary to adjust the variable resistance 35 until the signal $p$ at output II is likewise clearly distinguishable.

The arrangements of Figs. 10 and 11 make it possible to reduce the frequency band even compared to single sideband transmission of both signals separately, since the spacing between the sidebands will be eliminated. As a further refinement, designed to facilitate the isolation of frequency $f-q$ where the audio frequency band extends to very low frequencies, it is possible to replace the modulator 33 and the filter 34 by an arrangement which will first modulate with the frequency band obtained from output I an auxiliary carrier frequency $g$ generated locally, so as to produce two sidebands $g\pm q$ which are readily separable where $g$ is only slightly higher than the highest audio frequency $q$. By selecting the band $g+q$ and modulating with it a carrier frequency $f+g$ one obtains the two sidebands $f+2g+q$ and $f-q$ the latter of which is readily separable from the former. This method of modulation has not been illustrated since it is well known in the art but, if applied, will serve to utilize to further advantage the method and the arrangement provided by the present invention.

In Figs. 4–11 it is shown how a substantially distortion free output may be obtained if the carrier frequency is exactly available at the receiver. If this is not the case, the mutual distortion referred to in connection with Figs. 2 and 3 may be largely reduced through feedback. The signal obtained through amplitude detection may be fed back to the phase discriminator while the signal obtained through phase discrimination may be fed back to the amplitude detector circuit. If the modulated carrier wave has the form shown in the vector diagram of Fig. 3, i. e. if the phase varies symmetrically about a zero value, then it will be seen that both negative and positive peaks of the phase modulating signal $q$ will result in maximum distortion of amplitude; for this reason the output of the phase discriminator should be passed through a full-wave rectifying circuit without smoothing effect in such a manner that, say, the negative half-cycles will be inverted in polarity, the resulting pulsating wave being then fed back to the amplitude detector. With suitable adjustment of the amount of feedback it will be possible to reduce substantially the effects of mutual phase-amplitude distortion previously referred to even if the carrier is not available at the receiving station.

Figures 14, 15:
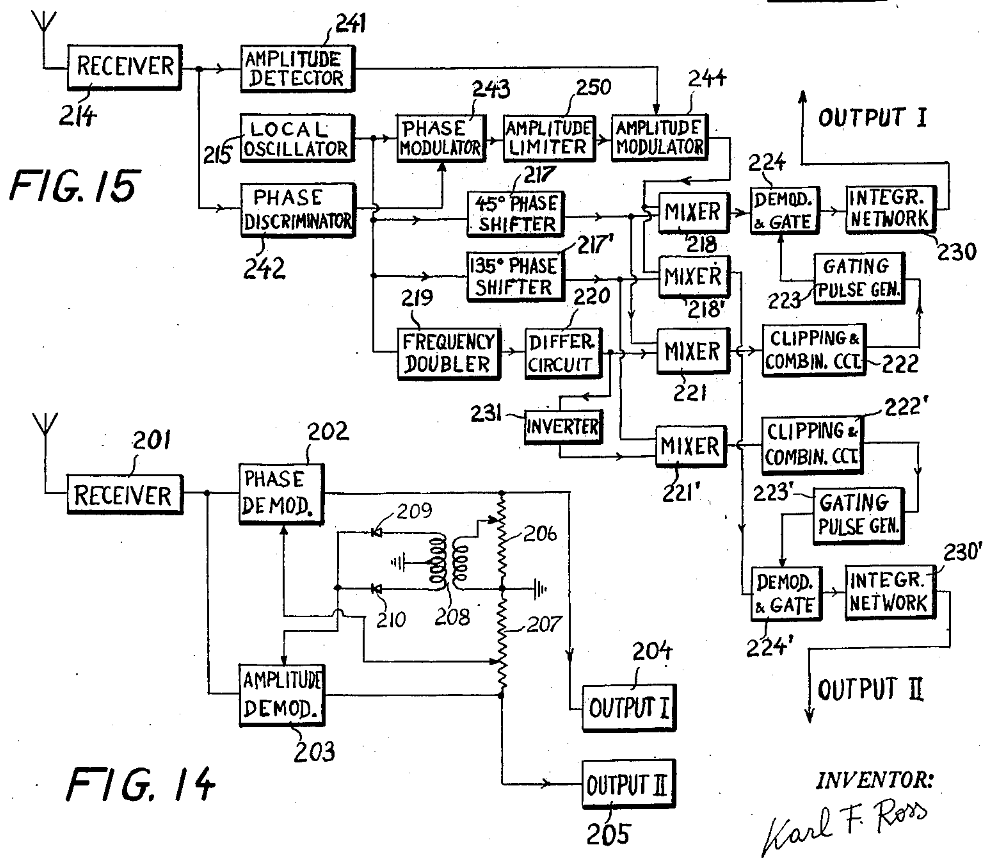
Fig. 14 is another circuit diagram of a receiver, illustrating an additional feature of the invention.
Fig. 15 is a circuit diagram of still another receiving arrangement according to the invention.

Fig. 14 illustrates an arrangement of the type described, comprising a receiver 201 which feeds a phase demodulator 202 and an amplitude demodulator 203 working into loads represented by resistors 206 and 207, respectively. A portion of the signal developed across resistor 206, taken from a potentiometer point thereof, is fed back through a full-wave rectification network including a transformer 208 and two rectifiers 209, 210 to an input of amplitude demodulator 203 to produce a modulation which counteracts the distortion of the amplitude signal $p$ by the phase signal $q$; similarly, a portion of the signal developed across resistor 207 is tapped off at a potentiometer point and is fed back to phase demodulator 202 to produce a modulation which counteracts the distortion of the phase signal $q$ by the amplitude signal $p$. The improved signals from the outputs of demodulators 202 and 203 are available at output circuits 204 and 205, respectively, which are analogous to those of Figs. 10 and 11.

Another method of obtaining essentially the same result where the precise carrier frequency is not available at the receiver is to transfer the demodulation products onto a locally generated substitute carrier and then to proceed in the manner described with reference to Figs. 4–11. This may be done as follows: A modulated wave including a large carrier component (e. g. such as wave 3 in Fig. 9a) is received and demodulated to produce separate signals corresponding, respectively, to phase and to amplitude variations; these signals will be rather distorted when compared with the original modulating signals $p$ and $q$. The locally generated substitute carrier is thereupon modulated in phase and in amplitude by these distorted demodulation products to produce a modulated wave similar to the wave received but having a known carrier frequency. This new wave, comprising at least one pair of conjugate sidebands which are either in phase or in quadrature with the local carrier, may now be demodulated by means of circuit arrangements such as shown in Figs. 10 and 11 to reproduce the substantially undistorted modulation signals. While the frequency of the local carrier does not seem to be critical, it will be desirable to adjust the circuits so that the modulation indices remain essentially the same for both carriers.

The phase modulated substitute carrier is preferably passed through an amplitude limiter before being subjected to amplitude modulation by the signal obtained from the envelope of the original carrier.

Reference may now be made to Fig. 15 for a circuit arrangement designed to carry out the method of reception just described. The system of Fig. 15 is in part analogous to that of Fig. 10 and elements corresponding to those of the latter figure have been designated by the same reference numerals preceded by a "2" in the hundreds position. Thus, receiver 214 works into an amplitude detector 241 and into a phase discriminator 242 which produce the initial, distorted signals, these signals being used to modulate the output of a local oscillator 215 with the aid of an amplitude modulator 244 and a phase modulator 243, respectively. Between the phase modulator 243, which is directly connected to local oscillator 215, and the subsequent amplitude modulator 244 there is inserted an amplitude limiter 250 to suppress spurious amplitude variations of the phase-modulated carrier. The remaining elements of Fig. 15 are all identical with respective elements of Fig. 10 and function in the manner described with reference to that figure, with the blocks 230, 230′ replacing the more fully illustrated integrating networks 24—30 and 24′—30′, respectively, of Fig. 10.

It may be noted that the method last described may also be adapted for the reception of normal signals transmitted over a single sideband including a large component of carrier as will be readily understood from the foregoing. Furthermore it will be apparent that the herein described method of phase discrimination, using principles disclosed in my Patent No. 2,530,081, is broadly applicable to all phase modulation systems wherein the carrier is available at the receiver and is not confined to the dual or diplex modulation system forming the subject matter of this specification.

Although certain preferred embodiments of the invention have been described and illustrated, it is to be distinctly understood that the invention is to be considered limited only by the objects and by the appended claims.

I claim:

1. The method of transmitting and receiving intelligence which comprises the steps of generating a first carrier wave, generating a second carrier wave of the same frequency as the first but in quadrature thereto, increasing the amplitude of the first carrier wave substantially over that of the second carrier wave, amplitude modulating the first carrier wave with a first signal at a given degree of modulation, amplitude modulating the second carrier with said first signal at the same degree of modulation, amplitude modulating the modulated second carrier with a second signal at a low degree of modulation, combining the two modulated carriers, thereby forming a composite wave, transmitting said composite wave, receiving the transmitted wave, detecting the envelope of the received wave, thereby substantially obtaining the first signal, and demodulating the received wave with respect to phase, thereby obtaining the second signal.

2. The method of transmitting and receiving intelligence which comprises the steps of generating a carrier wave; modulating the amplitude of said carrier wave with a first signal; modulating the phase of said carrier wave with a second signal; transmitting said doubly modulated carrier wave; receiving the transmitted wave; providing at the point of reception of said wave a pilot wave having the same frequency as said carrier wave; demodulating the received wave with respect to phase by deriving a first set of pulses from the received wave, deriving a second set of pulses from the pilot wave, each of said pulses occurring when the respective wave goes through zero, using each pulse of one set to initiate the generation of a cycle of a sawtooth wave, using each pulse of the other set to register the value of the sawtooth wave at the moment of its occurrence, and integrating said registered values to obtain a continuous wave of signal frequency; and demodulating the received wave with respect to amplitude.

3. The method of transmitting and receiving intelligence which comprises the steps of amplitude modulating a first carrier wave with a desired band of signal frequencies, thereby obtaining a first conjugate pair of sidebands, amplitude modulating a second carrier wave, in quadrature with said first carrier wave, with an accompanying band of signal frequencies, thereby obtaining a second conjugate pair of sidebands, transmitting a composite wave including said second pair of sidebands and at least one of said first pair of sidebands together with information indicating the instants when the vector representing said second pair of sidebands goes through zero, receiving said composite wave and said information, determining the instantaneous values of the composite wave at each of said instants, and integrating said instantaneous values, thus producing a continuous wave corresponding to said desired band of signal frequencies.

4. The method of transmitting and receiving intelligence which comprises the steps of modulating a carrier frequency with the narrower one of two bands of signal frequencies, thereby obtaining a conjugate pair of sidebands, modulating the same carrier frequency with the wider one of said two bands of signal frequencies, thereby obtaining at least one additional sideband, combining the said sidebands, thereby obtaining a composite wave, transmitting said composite wave, receiving said transmitted wave, providing at the point of reception of said wave a pilot wave having a frequency identical with said carrier frequency and having a known phase relationship with the vector of varying amplitude which represents the combination of said two conjugate sidebands, determining from the phase of said pilot wave and from said known phase relationship the instants when said vector goes through zero, determining the instantaneous values of the composite wave at each of said instants, integrating said instantaneous values, thus producing a continuous wave corresponding to said wider band of signal frequencies, modulating the band thus received with a frequency corresponding to said pilot frequency, thereby obtaining a sideband corresponding to said additional sideband, adding the sideband thus obtained to the received wave with such a polarity and magnitude as substantially to cancel out said additional sideband, and determining the value of the band of signal frequencies represented by the remaining sidebands.

5. The method of transmitting and receiving intelligence which comprises the steps of modulating a carrier frequency with a first band of signal frequencies, thereby obtaining a first pair of conjugate sidebands, modulating the same carrier frequency with a second band of signal frequencies, thereby obtaining a second pair of conjugate sidebands having a resulting vector in quadrature with the resulting vector of the first pair, combining said sidebands, thereby obtaining a composite wave, transmitting said composite wave, receiving the transmitted wave, providing at the point of reception of said wave a pilot wave having a frequency identical with said carrier frequency and having a known phase relationship with said vectors, determining from the phase of said pilot wave and from said known phase relationship the instants when the first vector goes through zero, determining the instantaneous values of the second vector at each of said instants, integrating said instantaneous values, thus producing a continuous wave corresponding to said second band of signal frequencies, using said pilot wave to determine the instants when the second vector goes through zero, determining the instantaneous values of the first vector at each of the last-mentioned instants, and integrating the last-mentioned values, thus producing a continuous wave corresponding to said first band of signal frequencies.

6. A method of receiving a first signal which modulates the amplitude of a carrier wave, said first signal being accompanied by a second signal which varies the phase of said carrier wave about a reference vector and incidentally distorts said first signal by increasing the amplitude of the carrier wave, said method comprising the steps of receiving said amplitude and phase modulated carrier wave, detecting the envelope of the carrier wave, thereby producing a first output corresponding to the distorted first signal, demodulating the carrier wave with respect to phase, thereby producing a second output corresponding to said second signal, inverting alternate half-cycles of said second output, thereby producing a pulsating signal of single polarity, and reducing the distortion of said first output by counter-modulating the carrier wave with said pulsating signal in a sense tending to decrease the amplitudes of the carrier.

7. In a receiver for a carrier wave phase and amplitude modulated with two signals including a desired signal, in combination, receiving means adapted to receive a band of frequencies including said phase and amplitude modulated carrier wave, a source of pilot wave having the same frequency as said carrier wave, a transmission path including normally blocked gating means, feed means applying said modulated carrier wave to said transmission path, synchronizing means deriving from said pilot wave a train of unblocking pulses, circuit means applying said pulses to said gating means in a sense momentarily rendering the latter conductive, voltage integrating means connected to said transmission path in the output of said gating means, an output circuit connected to said integrating means, and phasing means adjustable to make said pulses coincident with the instants when the contribution of said accompanying signal to the modulation of said carrier wave is substantially zero, thereby causing said integrating means to deliver to said output circuit a signal wave substantially corresponding to said desired signal.

8. In a receiver, the combination according to claim 7 wherein said phasing means is adjusted for timing said unblocking pulses to occur during the rising portion of the composite wave.

9. In a receiver, the combination according to claim 8 wherein said unblocking pulses have a duration substantially not more than one-quarter of a cycle of said pilot wave.

10. In a receiver, the combination according to claim 7 wherein said integrating means comprises a condenser, a charging circuit for said condenser including a rectifier, and a discharging circuit for said condenser including a resistor.

11. In a receiver, the combination according to claim 10, further comprising feedback means counter-modulating the carrier wave in conformity with said signal wave and substantially neutralizing the modulation giving rise to said signal wave, and detector means detecting the envelope of the counter-modulated wave, thereby producing a second signal wave substantially corresponding to the signal other than said desired signal.

12. A method of receiving a signal which modulates the amplitude of a carrier wave having phase variations, said method comprising the steps of receiving said modulated carrier wave, detecting the envelope of said wave, thereby producing a first intermediate output, demodulating said wave with respect to phase, thereby producing a second intermediate output, producing a local oscillation of constant frequency and amplitude, modulating said local oscillation in amplitude with said first intermediate output and in phase with said second intermediate output, thus producing a modulated local carrier wave, determining the values of said modulated local carrier wave at the instants when said local oscillation goes through its maximum, and integrating said values, thus producing a continuous wave substantially identical with said signal.

13. A method of receiving two signals including a first signal represented by two conjugate sidebands of a carrier wave and a second signal represented by at least one additional sideband, said method comprising the steps of receiving a composite wave of varying phase and amplitude including said conjugate pair of sidebands and said additional sideband and a carrier component having a known phase angle with respect to said conjugate pair of sidebands, detecting the envelope of the composite wave, thereby producing a first intermediate output, demodulating the composite wave with respect to phase, thereby producing a second intermediate output, producing a local oscillation of constant frequency and amplitude, modulating said local oscillation in amplitude with said first intermediate output and modulating said local oscillation in phase with said second intermediate output, thereby producing a modulated local carrier wave, determining the values of said modulated local carrier wave at the instants when said local oscillation has a phase displacement from its maximum equal to said known phase angle, the modulation of said local oscillation due to said first signal being substantially zero at said instants, integrating said values, thus producing a continuous wave substantially identical with said second signal, determining the values of said modulated local carrier wave at other instants substantially 90° out of phase with the first-mentioned instants, and reproducing said first signal from the values determined at said other instants.

14. The method according to claim 13, comprising the further step of reducing distortion of said first by said second signal by inverting said second signal and combining at least a portion of said inverted signal with said composite wave prior to the reproduction of said first signal.

15. A method of receiving a first signal represented by at least one sideband of a carrier wave subject to distorting modulation by a second signal giving rise to a pair of conjugate sidebands of said carrier wave, said method comprising the steps of receiving a composite wave of varying phase and amplitude including said one sideband, said conjugate sidebands and a carrier component having a known phase angle with respect to said conjugate pair of sidebands, detecting the envelope of the composite wave, thereby producing a first intermediate output, demodulating the composite wave with respect to phase, thereby producing a second intermediate output, producing a local oscillation of constant frequency and amplitude, modulating said local oscillation in amplitude with said first intermediate output and modulating said local oscillation in phase with said second intermediate output, thereby producing a modulated local carrier wave, determining the values of said modulated local carrier wave at the instant when said local oscillation has a phase displacement from its maximum equal to said known phase angle, the modulation of said local oscillation due to said first signal being substantially zero at such instants, and integrating said values, thus producing a continuous wave substantially identical with said second signal.

16. A method of receiving two signals including a first signal represented by two conjugate sidebands of a carrier wave and a second signal represented by at least one additional sideband, said method comprising the steps of receiving a composite wave of varying phase and amplitude including said conjugate pair of sidebands and said additional sideband, producing a pilot wave of the mean frequency of said conjugate pair of sidebands and having a known phase relation thereto, determining from the phase of said pilot wave and from said known phase relationship the instants when the contribution of said conjugate pair of sidebands to the composite wave is zero, determining the values of said composite wave at said instants, integrating said values, thus producing a continuous wave substantially identical with said first signal, determining the values of said composite wave at other instants substantially 90° out of phase with the first-mentioned instants, and reproducing said second signal from the values determined at said other instants.

17. The method according to claim 16, comprising the further step of reducing distortion of said second by said first signal by inverting said first signal and combining at least a portion of said inverted signal with said composite wave prior to reproduction of said second signal.

18. A method of receiving a first signal, represented by at least one sideband of a carrier wave, accompanied by a second signal represented by a pair of conjugate sidebands of a carrier wave, said method comprising the steps of receiving a composite wave of varying phase and amplitude including said one sideband and said conjugate sidebands, producing a pilot wave of the mean frequency of said conjugate pair of sidebands and having a known phase relation thereto, determining from the phase of said pilot wave and from said known phase relationship the instants when the contribution of said conjugate pair of sidebands to the composite wave is zero, determining the values of said composite wave at said instants, integrating said values, thus producing a continuous wave substantially identical with said first signal, determining the values of said composite wave at other instants substantially 90° out of phase with the first-mentioned instants, and reproducing said second signal from the values determined at said other instants.

19. The method of receiving one of two signals transmitted over a single carrier wave which comprises the steps of receiving a carrier wave having its amplitude modulated by one and its phase modulated by the other of two signals including a first and a second signal, said first signal being subject to distortion from said second signal, demodulating said wave with respect to amplitude and to phase, thereby producing a pair of outputs including a first output corresponding to the distorted first signal and a second output corresponding to the second signal, and reducing the distortion of said first output by countermodulating said carrier wave in accordance with said second output before demodulating the carrier wave to produce the first output.

20. The method of receiving two signals transmitted over a single carrier wave which comprises the steps of receiving a carrier wave having its amplitude modulated by a first and its phase modulated by a second signal, said signals being subject to mutual distortion, demodulating the carrier wave with respect to amplitude, thereby producing a first output corresponding to the distorted first signal, demodulating the carrier wave with respect to phase, thereby producing a second output corresponding to said second signal, and reducing the distortion of said outputs by counter-modulating said carrier wave in accordance with each of said outputs before respectively demodulating the carrier wave to produce the respective other of said outputs.

KARL F. ROSS.

REFERENCES CITED

The following references are of record in the file of this patent:

UNITED STATES PATENTS

| Number | Name | Date |
|---|---|---|
| 1,666,158 | Affel | Apr. 17, 1928 |
| 1,684,455 | Nyquist | Sept. 18, 1928 |
| 1,797,317 | Brand | Mar. 24, 1931 |
| 1,854,247 | Brand | Apr. 19, 1932 |
| 2,075,071 | Usselman | Mar. 30, 1937 |
| 2,103,847 | Hansel | Dec. 28, 1937 |
| 2,256,317 | Earp | Sept. 16, 1941 |
| 2,378,298 | Hilferty | June 12, 1945 |
| 2,403,957 | Seeley | July 16, 1946 |
| 2,413,396 | Weagant | Dec. 31, 1946 |
| 2,441,957 | De Rosa | May 27, 1948 |

FOREIGN PATENTS

| Number | Country | Date |
|---|---|---|
| 541,665 | Great Britain | Dec. 5, 1941 |